(12) United States Patent
Johansson et al.

(10) Patent No.: US 12,047,229 B2
(45) Date of Patent: Jul. 23, 2024

(54) CONFIGURING A TARGET DEVICE

(71) Applicant: ASSA ABLOY AB, Stockholm (SE)

(72) Inventors: Simon Johansson, Årsta (SE); Felix Grape, Lidingö (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 17/777,374

(22) PCT Filed: Nov. 18, 2020

(86) PCT No.: PCT/EP2020/082501
§ 371 (c)(1),
(2) Date: May 17, 2022

(87) PCT Pub. No.: WO2021/099367
PCT Pub. Date: May 27, 2021

(65) Prior Publication Data
US 2022/0417089 A1    Dec. 29, 2022

(30) Foreign Application Priority Data

Nov. 19, 2019    (SE) .................................. 1951331-6

(51) Int. Cl.
*H04L 41/0803* (2022.01)
*H04L 9/08* (2006.01)
(Continued)

(52) U.S. Cl.
CPC ........ *H04L 41/0803* (2013.01); *H04L 9/0825* (2013.01); *H04L 9/3236* (2013.01); *H04L 67/133* (2022.05)

(58) Field of Classification Search
CPC ..... H04L 9/08; H04L 9/25; H04L 9/32; H04L 9/40; H04L 9/0825; H04L 9/3213;
(Continued)

(56) References Cited

U.S. PATENT DOCUMENTS

| 6,292,897 B1 * | 9/2001 | Gennaro | ................ H04L 9/321 |
|---|---|---|---|
| | | | 713/180 |
| 6,647,494 B1 * | 11/2003 | Drews | .................... H04L 63/12 |
| | | | 713/1 |

(Continued)

FOREIGN PATENT DOCUMENTS

| CN | 105516948 | 4/2016 |
|---|---|---|
| CN | 107223326 | 9/2017 |

(Continued)

OTHER PUBLICATIONS

Gorny "Attack on git signature verification via crafting multiple signatures," Jan. 26, 2019, 3 pages [retrieved online from: mgorny.pl/articles/attack-on-git-signature-verification.html].

(Continued)

*Primary Examiner* — James N Fiorillo
(74) *Attorney, Agent, or Firm* — Schwegman Lundberg & Woessner, P.A.

(57) ABSTRACT

It is provided a method for configuring a target device. The method comprises the steps of: transmitting a configuration request message to the target device, the configuration request message comprising a configuration request and a request signature, wherein the request signature is based on the configuration request; receiving a configuration response message from the target device, the configuration response message comprising a configuration response and a response signature, wherein the response signature is based on the configuration response and the request signature; verifying the response signature to determine whether the configuration response message is valid, based on the configuration response, the request signature and a public key for the target device; and transmitting a configuration commit message to the target device only when the configuration response message is valid, the configuration commit message com- (Continued)

prising a configuration commit indicator and a commit signature.

13 Claims, 4 Drawing Sheets

(51) Int. Cl.
  *H04L 9/32* (2006.01)
  *H04L 67/133* (2022.01)
(58) Field of Classification Search
  CPC ... H04L 9/3231; H04L 9/3236; H04L 9/3247; H04L 41/28; H04L 41/082; H04L 41/0802; H04L 41/0803; H04L 67/00; H04L 67/34; H04L 67/133; H04L 63/12; H04L 63/168; G06F 21/30; G06F 21/57; G06F 8/65; G06F 9/4416; H04W 4/80; H04R 25/00; A61B 5/0031; A61B 5/686; A61B 5/6867
  USPC ......................................................... 709/220
  See application file for complete search history.

(56) References Cited

U.S. PATENT DOCUMENTS

| | | | | |
|---|---|---|---|---|
| 8,613,070 | B1* | 12/2013 | Borzycki | H04L 67/104 726/8 |
| 9,801,216 | B1* | 10/2017 | Williams | H04W 12/50 |
| 10,330,784 | B2* | 6/2019 | Cavendish | H04W 84/12 |
| 2003/0158961 | A1* | 8/2003 | Nomura | H04L 9/40 709/237 |
| 2005/0149737 | A1* | 7/2005 | Driscoll | G06F 21/51 713/182 |
| 2014/0032920 | A1* | 1/2014 | Gehrmann | G06F 21/57 713/168 |
| 2015/0363576 | A1* | 12/2015 | Medvinsky | H04L 9/3247 726/26 |
| 2016/0173997 | A1* | 6/2016 | Pedersen | H04L 63/123 381/314 |
| 2016/0352526 | A1* | 12/2016 | Adler | G06Q 90/00 |
| 2018/0091484 | A1* | 3/2018 | Atta | G06F 15/7871 |
| 2018/0241570 | A1* | 8/2018 | Pang | H04W 12/062 |
| 2019/0036688 | A1* | 1/2019 | Wasily | H04L 9/3231 |
| 2019/0056925 | A1* | 2/2019 | Komano | H04L 41/0866 |
| 2019/0245704 | A1* | 8/2019 | Pala | H04L 67/01 |
| 2020/0280855 | A1* | 9/2020 | Avetisov | H04L 63/0884 |
| 2020/0305716 | A1* | 10/2020 | Mondello | H04W 12/069 |
| 2021/0007814 | A1* | 1/2021 | Shuma | A61B 34/74 |

FOREIGN PATENT DOCUMENTS

| | | |
|---|---|---|
| CN | 107241339 | 10/2017 |
| JP | 2000-235528 | 8/2000 |
| WO | WO 2016/202375 | 12/2016 |
| WO | 2021099367 | 5/2021 |

OTHER PUBLICATIONS

Watson et al. "Zero Touch Provisioning for Networking Devices draft-ietf-netfconf-zerotouch-26," IETF Trust, Dec. 20, 2018, Internet-Draft, 95 pages [retrieved online from: tools.ietf.org/html/draft-ietf-netconf-zerotouch-26].

Official Action for Sweden Patent Application No. 1951331-6, dated Sep. 22, 2020, 6 pages.

Official Action for Sweden Patent Application No. 1951331-6, dated May 5, 2021, 3 pages.

International Search Report and Written Opinion for International (PCT) Patent Application No. PCT/EP2020/082501, dated Dec. 9, 2020, 12 pages.

International Preliminary Report on Patentability for International (PCT) Patent Application No. PCT/EP2020/082501, dated Oct. 25, 2021.

"International Application Serial No. PCT EP2020 082501, Response to Written Opinion filed Sep. 20, 2021 to Written Opinion mailed Dec. 9, 2020", 9 pgs.

"European Application Serial No. 20808110.9, Communication under Rule 71(3) EPC", 35 pgs.

"191336CN_240208_1st Office Action with Search Report Feb. 8, 2024", with English translation, 15 pages.

Chi, Yaping, "Design of trusted signature system based on TCM", Computer Engineering and Design Computer Engineering and Design 2258 2011, vol. 32 No. 7 with machine English translation, (2011), 8 pages.

* cited by examiner

CONFIGURING A TARGET DEVICE

CROSS REFERENCE TO RELATED APPLICATIONS

This application is a national stage application under 35 U.S.C. 371 and claims the benefit of PCT Application No. PCT/EP2020/082501 having an international filing date of Nov. 18, 2020, which designated the United States, which PCT application claimed the benefit of Sweden Patent Application No. 1951331-6 filed Nov. 19, 2019, the disclosure of each of which are incorporated herein by reference.

TECHNICAL FIELD

The present disclosure relates to the field of configuration of devices and in particular to the use of a user device to configure a target device.

BACKGROUND

Configuration of devices can be performed in many different ways. The most common way is to provide a user interface of the device to allow a user to thereby configure various parameters of the device.

Another way is to let the device be configured by another device. We here denote the device to be configured the target device, and denote the device performing the configuration the user device. Such an arrangement works well in many circumstances. However, some target devices are particularly important. For instance, target devices where configuration affects safety of people, also known as safety critical devices, need a secure way to be configured where a configuration session cannot be hijacked by another entity.

SUMMARY

One object is to improve security of configuration of target devices by a user device.

According to a first aspect, it is provided a method for configuring a target device. The method comprises the steps, performed by a user device, of: transmitting a configuration request message to the target device, the configuration request message comprising a configuration request and a request signature, wherein the request signature is based on the configuration request; receiving a configuration response message from the target device, the configuration response message comprising a configuration response and a response signature, wherein the response signature is based on the configuration response and the request signature; verifying the response signature to determine whether the configuration response message is valid, based on the configuration response, the request signature and a public key for the target device; and transmitting a configuration commit message to the target device only when the configuration response message is valid, the configuration commit message comprising a configuration commit indicator and a commit signature, wherein the commit signature is based on the configuration commit indicator and the response signature.

The method may further comprise the steps of: receiving a configuration acknowledgement message from the target device, the configuration acknowledgement message comprising a configuration acknowledgement and an acknowledgement signature, wherein the acknowledgement signature is based on the configuration acknowledgement and the commit signature; and verifying the acknowledgement signature to determine whether configuration acknowledgement message is valid, based on the configuration acknowledgement, the commit signature and a public key for the target device.

Each signature may be applied to a hash value of the input data for the signature.

All messages may comprise the same single remote procedure call, RPC, identifier.

The step of transmitting a configuration request message may comprise generating the request signature based on a secret key of the user device and the step of transmitting a configuration commit message may comprise generating the commit signature based on a secret key of the user device.

According to a second aspect, it is provided a user device for configuring a target device. The user device comprises: a processor; and a memory storing instructions that, when executed by the processor, cause the user device to transmit a configuration request message to the target device, the configuration request message comprising a configuration request and a request signature, wherein the request signature is based on the configuration request; receive a configuration response message from the target device, the configuration response message comprising a configuration response and a response signature, wherein the response signature is based on the configuration response and the request signature; verify the response signature to determine whether the configuration response message is valid, based on the configuration response, the request signature and a public key for the target device; and transmit a configuration commit message to the target device only when the configuration response message is valid, the configuration commit message comprising a configuration commit indicator and a commit signature, wherein the commit signature is based on the configuration commit indicator and the response signature.

According to a third aspect, it is provided a computer program for configuring a target device. The computer program comprises computer program code which, when run on a user device causes the user device to: transmit a configuration request message to the target device, the configuration request message comprising a configuration request and a request signature, wherein the request signature is based on the configuration request; receive a configuration response message from the target device, the configuration response message comprising a configuration response and a response signature, wherein the response signature is based on the configuration response and the request signature; verify the response signature to determine whether the configuration response message is valid, based on the configuration response, the request signature and a public key for the target device; and transmit a configuration commit message to the target device only when the configuration response message is valid, the configuration commit message comprising a configuration commit indicator and a commit signature, wherein the commit signature is based on the configuration commit indicator and the response signature.

According to a fourth aspect, it is provided a computer program product comprising a computer program according to the third aspect and a computer-readable means on which the computer program is stored.

According to a fifth aspect, it is provided a method for configuring a target device. The method comprising the steps, performed by the target device, of: receiving a configuration request message from a user device, the configuration request message comprising a configuration request and a request signature, wherein the request signature is based on the configuration request; verifying the request signature to determine whether configuration request message is valid, based on the configuration request and a public key for the user device; transmitting a configuration response message to the user device only when the configuration request message is valid, the configuration response message comprising a configuration response and a response signature, wherein the response signature is based on the configuration response and the request signature; receiving a configuration commit message from the user device only when the configuration request message is valid, the configuration commit message comprising a configuration commit indicator and a commit signature, wherein the commit signature is based on the configuration commit indicator and the response signature; and verifying the commit signature to determine whether configuration commit message is valid, based on the configuration commit indicator, the response signature and a public key for the user device.

The method may further comprise the step, after the step of receiving the configuration commit message, of: verifying the commit signature to determine whether configuration commit message is valid, based on the configuration commit indicator, the response signature and a public key for the user device.

The method may further comprise the steps of: applying configuration for the target device in accordance with the configuration request; and transmitting a configuration acknowledgement message to the user device, the configuration acknowledgement message comprising a configuration acknowledgement and an acknowledgement signature, wherein the acknowledgement signature is based on the configuration acknowledgement and the configuration commit signature.

The step of transmitting a configuration acknowledgement message may comprise generating the acknowledgement signature based on a secret key of the target device.

Each signature may be applied to a hash value of the input data for the signature.

All messages may comprise the same single remote procedure call, RPC, identifier.

The step of transmitting a configuration response message may comprise generating the response signature based on a secret key of the target device.

According to a sixth aspect, it is provided a target device comprising: a processor; and a memory storing instructions that, when executed by the processor, cause the target device to: receive a configuration request message from a user device, the configuration request message comprising a configuration request and a request signature, wherein the request signature is based on the configuration request; verify the request signature to determine whether configuration request message is valid, based on the configuration request and a public key for the user device; transmit a configuration response message to the user device only when the configuration request message is valid, the configuration response message comprising a configuration response and a response signature, wherein the response signature is based on the configuration response and the request signature; receive a configuration commit message from the user device only when the configuration request message is valid, the configuration commit message comprising a configuration commit indicator and a commit signature, wherein the commit signature is based on the configuration commit indicator and the response signature; and verify the commit signature to determine whether configuration commit message is valid, based on the configuration commit indicator, the response signature and a public key for the user device.

According to a seventh aspect, it is provided a computer program for configuring a target device. The computer program comprises computer program code which, when run on a target device causes the target device to: receive a configuration request message from a user device, the configuration request message comprising a configuration request and a request signature, wherein the request signature is based on the configuration request; verify the request signature to determine whether configuration request message is valid, based on the configuration request and a public key for the user device; transmit a configuration response message to the user device only when the configuration request message is valid, the configuration response message comprising a configuration response and a response signature, wherein the response signature is based on the configuration response and the request signature; and receive a configuration commit message from the user device only when the configuration request message is valid, the configuration commit message comprising a configuration commit indicator and a commit signature, wherein the commit signature is based on the configuration commit indicator and the response signature; and verify the commit signature to determine whether configuration commit message is valid, based on the configuration commit indicator, the response signature and a public key for the user device.

According to an eighth aspect, it is provided a computer program product comprising a computer program according to the seventh aspect and a computer-readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
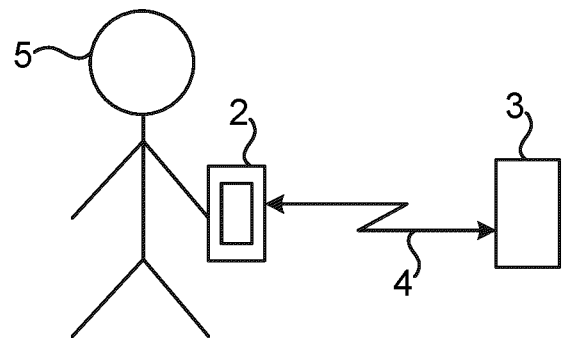
FIG. 1 is a schematic drawing illustrating an environment in which embodiments presented herein can be applied.

FIG. 1 is a schematic drawing illustrating an environment in which embodiments presented herein can be applied. A target device 3 is a device that can be configured by a user device 2. The target device 3 is a device for which it needs to be secured when and by whom any configuration is applied. For instance, the target device 3 can be a device for which certain safety requirements exist, such as industrial equipment where operators are present. One specific example of a target device is an industrial door. For industrial doors, such configuration parameters can e.g. be motor torque and/or motor speed.

The user device 2 is any suitable device with a user interface allowing the user 5 to provide details on what is to be configured and configuration parameters to be applied at the target device 3. For example, the user device 2 can be a wearable device, smartphone, tablet computer, laptop computer, desktop computer, etc.

There is a communication link 4, enabling data communication between the user device 2 and the target device 3. The communication link 4 can be a local communication link, e.g. over Bluetooth, BLE (Bluetooth Low Energy), any of the IEEE 802.11x standards, etc. Alternatively or additionally, the communication link 4 is based on networks with greater coverage such as a cellular network and/or the Internet. The communication link can be based on IP (Internet Protocol) based communication. The communication link 4 can be based on virtual ports in the user device 2 and/or the target device to enable distinction between simultaneous communication sessions over a single transport layer.

The communication link 4 enables the user device 2 to control configuration of the target device 3 as described in more detail below.

Figure 2:
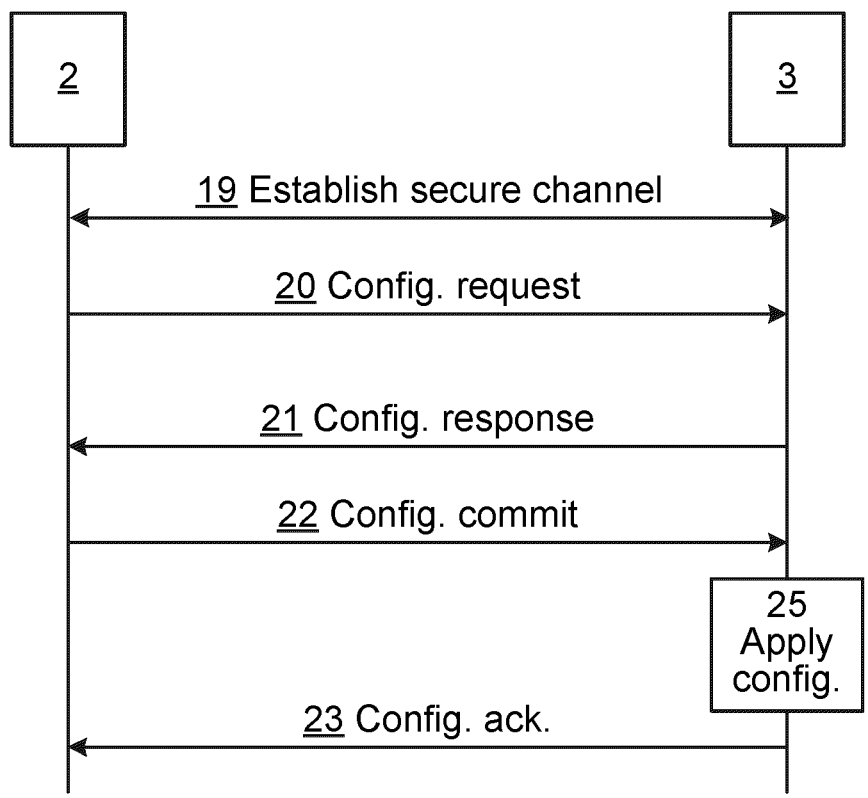
FIG. 2 is a sequence diagram illustrating communication between the user device and the target device in FIG. 1.

FIG. 2 is a sequence diagram illustrating communication between the user device 2 and the target device 3 in FIG. 1. The sequence will be described also with reference to FIGS. 3A-D, which are schematic diagrams illustrating content of messages shown in FIG. 2.

Prior to the sequence starting, the user controls the user device 2 in any suitable manner to set one or more configuration parameters to be applied by the target device 3. This can e.g. be achieved using a user interface of the user device 2.

First, a secure channel is established 19 between the user device 2 and the target device 3. This includes establishing a transport layer session e.g. using TCP (Transport Control Protocol) over IP. A cryptographic protocol is followed, such that both the user device 2 and the target device 3 prove their identity and can agree on a shared secret which is used for encryption/decryption and ensuring integrity for subsequent communication. The user device 2 proves to the target device 3 that the user device 2 is in possession of a secret key corresponding to a public key used for establishing the secure channel. The reverse is also true, i.e. that the target device 3 proves to the user device 2 that the target device 3 is in possession of a secret key corresponding to a public key used for establishing the secure channel. After this, a secure and authentic channel is established between the user device 2 and the target device 3 and both devices 2, 3 have the public key of their respective counterpart. The secure channel can be used for the subsequent messaging.

Figure 3A:
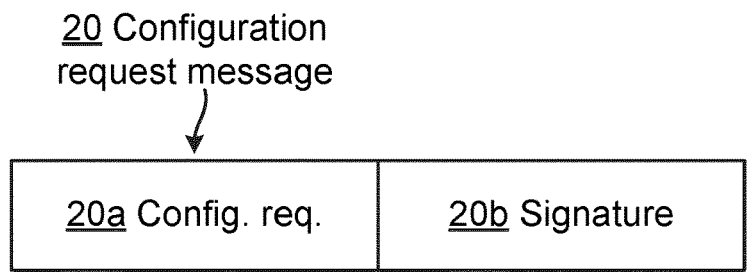
FIGS. 3A-D are schematic diagrams illustrating content of messages shown in FIG. 2.

To start the sequence, the user device 2 transmits a configuration request message 20 to the target device 3. The configuration request message 20 comprises a configuration request 20a and a request signature 20b, as shown in FIG. 3A. The configuration request indicates that the user device 2 requests a configuration to be applied by the target device 3. The configuration request comprises one or more configuration parameters, defining the configuration which is requested to be applied. The request signature 10b is applied by the user device 2 and is based on the configuration request 20a and a secret key of the user device 2. Since the configuration parameters form part of the configuration request 20a, these configuration parameters are also secured by the request signature 10b.

In one embodiment, the configuration requests are different in each configuration session, e.g. by including a unique request identifier or session identifier. In this way, if a third party detects the communication and tries to replay the same data, this can be detected by the target device and the replay configuration is blocked. In other words, the target device can be configured to detect a session identifier and block configuration if the session identifier has been used before to configure the target device.

This and all signatures described herein are cryptographic signatures, based on asymmetric cryptography. The entity performing the signing applies the signature based on its secret key. The signature can be verified by anyone using a public key (from the secure channel establishment 19) of the entity performing the signing.

Figure 3B:
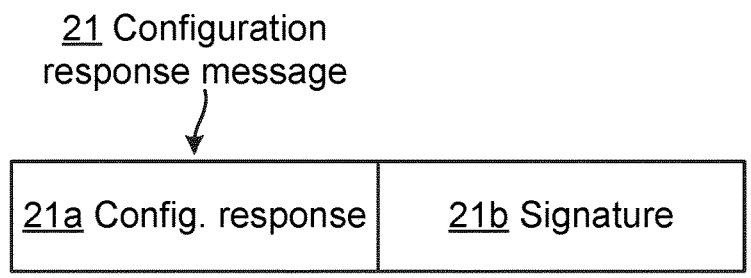

The target device 3 validates the configuration request message 20 and determines whether to accept the requested configuration. If this is not accepted, the sequence ends or the target device 3 optionally informs user device 2 of the rejected configuration request. If the configuration request is accepted, the target device 3 responds with a configuration response message 21. The configuration response message 21 comprises a configuration response 21a and a response signature 21b, as shown in FIG. 3B. The configuration response 21a indicates that the target device 3 accepts the requested configuration and is ready to apply the configuration. The response signature 21b is applied by the target device 3 and is based on the configuration response 21a, the request signature 20b and a secret key of the target device 3. For instance, the response signature 21b can be derived based on a concatenation of the configuration response 21a and the request signature 20b, by using the secret key of the target device 3 in s cryptographic signing operation.

Figure 3C:
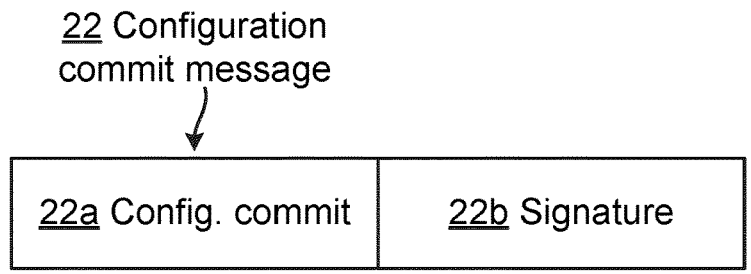

The user device 2 validates the configuration response message 21 and determines whether to proceed and commit to the configuration. This can e.g. be determined by querying the user whether to commit using the user interface of the user device 2. If the user device 2 determines not to commit to the configuration, the sequence ends or the user device 2 optionally informs target device 3 of the absent commit. If a commit is determined, the user device 2 transmits a configuration commit message 22 to the target device 3. The configuration commit message 22 comprises a configuration commit indicator 22a and a commit signature 22b, as shown in FIG. 3C. The configuration commit indicator indicates that the user device 2 commits to the configuration to be applied by the target device 3. The commit signature 22b is applied by the user device 2 and is based on the configuration commit indicator 22a, the response signature 21b and a secret key of the user device 2. For instance, the commit signature 22b can be derived based on a concatenation of the configuration commit indicator 22a and the response signature 21*b*, by using the secret key of the user device 2 in s cryptographic signing operation.

Figure 3D:
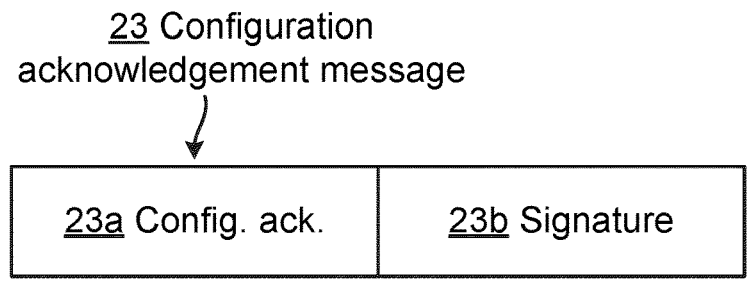

The target device 3 validates the configuration commit message 22 now applies 25 the configuration in accordance with the configuration parameters. Once the configuration is applied, the target device 3 optionally transmits a configuration acknowledgement message 23. The configuration acknowledgement message 23 comprises a configuration acknowledgement 23*a* and an acknowledgement signature 23*b*, as shown in FIG. 3D. The configuration acknowledgement 23*a* indicates that the target device 3 has applied the requested configuration. The acknowledgement signature 23*b* is applied by the target device 3 and is based on the configuration acknowledgement 23*a*, the commit signature 22*b* and a secret key of the target device 3.

Figure 4:
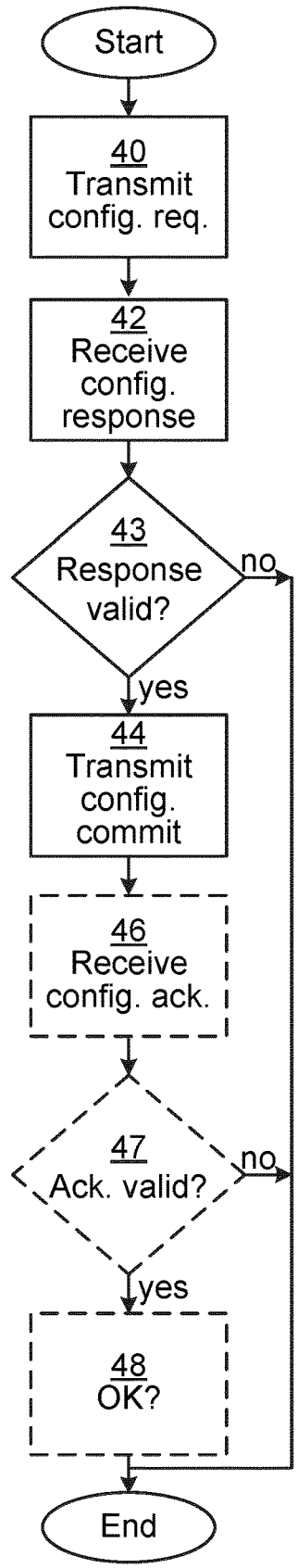
FIG. 4 is a flow chart illustrating embodiments of methods for configuring the target device of FIG. 1, performed in the user device.

FIG. 4 is a flow chart illustrating embodiments of methods for configuring the target device of FIG. 1, performed in the user device. The steps of this method essentially correspond to the actions of the user device illustrated in FIG. 2, described above.

In a transmit config (configuration) req (request) step 40, the user device transmits a configuration request message to the target device. As described above, the configuration request message comprises a configuration request and a request signature. The request signature is based on the configuration request, as well as a secret key of the user device.

In a receive config response step 42, the user device receives a configuration response message from the target device. As described above, the configuration response message comprises a configuration response and a response signature. The response signature is based on the configuration response and the request signature, as well as a secret key of the target device.

In a conditional response valid step 43, the user device verifies the response signature to determine whether the configuration response message is valid. This verification is based on the configuration response, the request signature and a public key for the target device. If the verification is positive, i.e. the configuration response is valid, the method continues to a transmit config commit step 44. Otherwise, the method ends.

In the transmit config commit step 44, the user device transmits a configuration commit message to the target device. As described above, the configuration commit message comprises a configuration commit indicator and a commit signature. The commit signature is based on the configuration commit indicator and the response signature, as well as a secret key of the user device.

In an optional receive config ack (acknowledgement) step 46, the user device receives a configuration acknowledgement message from the target device. As described above, the configuration acknowledgement message comprises a configuration acknowledgement and an acknowledgement signature. The acknowledgement signature is based on the configuration acknowledgement and the commit signature, as well as a secret key of the target device.

In an optional conditional ack. valid step 47, the user device verifies the acknowledgement signature to determine whether the configuration acknowledgement message is valid. The verification is based on the configuration acknowledgement, the commit signature and a public key for the target device. If the verification is positive, i.e. the configuration acknowledgement is valid, the method proceeds to an optional ok step 48. Otherwise, the method ends.

Optionally, each signature mentioned above is applied to a hash value of the input data for the signature. This is more computationally efficient than calculating the signature based on the input data without intermediate hashing.

All messages mentioned above comprise the same single remote procedure call, RPC, identifier.

In the optional ok step 48, the user device handles the successful configuration. This can e.g. include storing the messages received from the target device. At this stage, since a valid configuration acknowledgement has been received, the user device is certain that the configuration has been applied in the target device.

Figure 5:
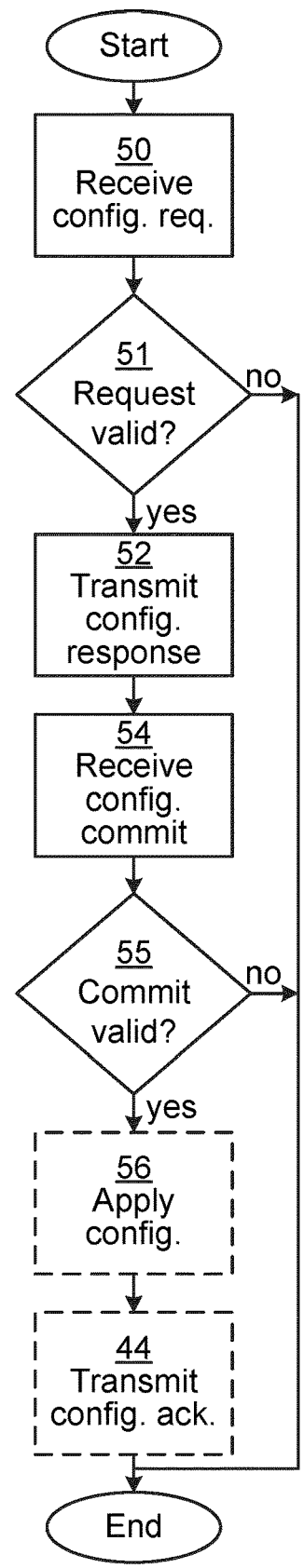
FIG. 5 is a flow chart illustrating embodiments of methods for configuring the target device of FIG. 1, performed in the target device.

FIG. 5 is a flow chart illustrating embodiments of methods for configuring the target device of FIG. 1, performed in the target device. The steps of this method essentially correspond to the actions of the target device illustrated in FIG. 2, described above.

In a receive config req step 50, the target device receives a configuration request message from a user device. The configuration request message comprises a configuration request and a request signature. The request signature is based on the configuration request, as well as a secret key of the user device.

In a conditional request valid step 51, the target device verifies the request signature to determine whether the configuration request message is valid. The verification is based on the configuration request and a public key for the user device. Optionally, the configuration request message is only considered to be valid if a session identifier in the message is one that the target device has not seen before. In one embodiment, the session identifier is not the RPC identifier since this can be freely set by the client and does not need to be unique. In such an embodiment, the session identifier is generated to be globally unique, or at least globally unique with a very high probability. If the verification is positive, i.e. the configuration request message is valid, the method proceeds to a transmit config response step 52. Otherwise, the method ends.

In the transmit config response step 52, the target device transmits a configuration response message to the user device. The configuration response message comprises a configuration response and a response signature. The response signature is based on the configuration response and the request signature, as well as a secret key of the target device.

In a receive config commit message step 54, the target device receives a configuration commit message from the user device. The configuration commit message comprises a configuration commit indicator and a commit signature. The commit signature is based on the configuration commit indicator and the response signature, as well as a secret key of the user device. Optionally, if the config commit message is not received within a predetermined time from when the configuration response message was sent, a time-out is triggered and the method ends. This ends the configuration session, allowing the same or other user device to start a new configuration session when desired.

In a conditional commit valid step 55, the target device verifies the commit signature to determine whether configuration commit message is valid. This verification is based on the configuration commit indicator, the response signature as well as a public key for the user device. The public key used here is the same public key that is used for verification of the configuration request message, whereby only the user device that sent the configuration request message can send a valid configuration commit message. When the commit is valid, the method optionally proceeds to an apply config step 56, or ends with the knowledge of valid message flow. When the commit is not valid, the method ends with the knowledge of invalid commit and an invalid message flow.

In the optional apply config step 56, the target device applying configuration for the target device in accordance with the configuration request.

In an optional transmit config ack step 58, the target device transmits a configuration acknowledgement message to the user device. The configuration acknowledgement message comprises a configuration acknowledgement and an acknowledgement signature. The acknowledgement signature is based on the configuration acknowledgement and the configuration commit signature, as well as a secret key of the target device. The transmission of the configuration acknowledgement indicates to the user device that the configuration has been successfully applied.

As mentioned above, each signature is optionally applied to a hash value of the input data for the signature. Moreover, all messages can comprise the same single remote procedure call, RPC, identifier.

Each signature (except for the first message) is based on the signature of the previous message. This is an efficient way to provide a certainty of the actions of the two entities (the user device and the target device). Moreover, another user device is unable to deliberately or inadvertently hi-jack a configuration session, since it does not have access to the secret key of the user device of the configuration session.

Each one of the user device and the target device can store the messages, including the signatures, to thereby have non-repudiable records of the configuration and the entities involved. In this way, it can be proved at a later stage, e.g. the identity of the user device (and optionally the user) that performed the configuration as well as the configuration that was applied.

Figure 6:
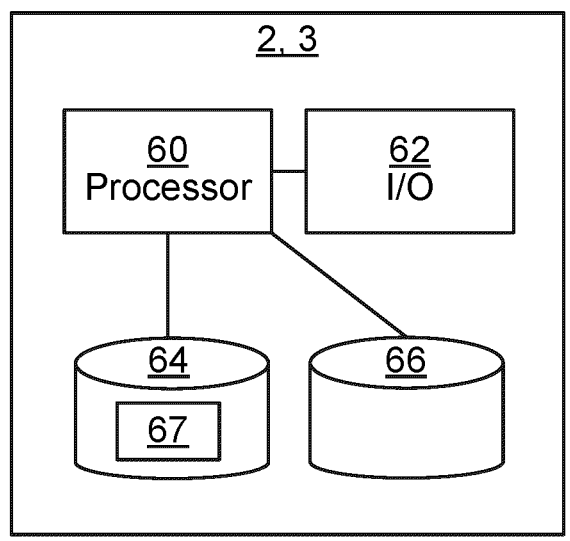
FIG. 6 is a schematic diagram illustrating components of the target device and the user device of FIG. 1.

FIG. 6 is a schematic diagram illustrating components of each one of the target device 3 and the user device 2 of FIG. 1. A processor 60 is provided using any combination of one or more of a suitable central processing unit (CPU), multi-processor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 4 (for the user device 2) and FIG. 5 (for the target device) above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The devices 1, 2 further comprises an I/O interface 62 for communicating with external and/or internal entities. Optionally, the I/O interface 62 also includes a user interface.

Other components of the devices 1, tare omitted in order not to obscure the concepts presented herein.

Figure 7:
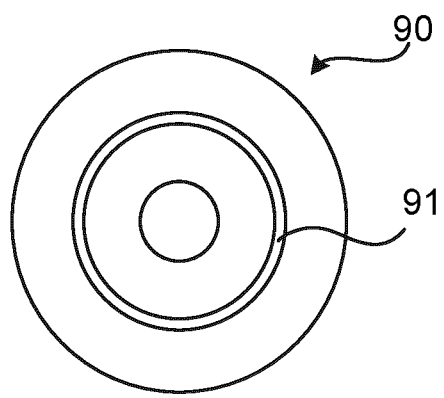
FIG. 7 shows one example of a computer program product comprising computer-readable means.

FIG. 7 shows one example of a computer program product 90 comprising computer-readable means. On this computer-readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 6. While the computer program 91 is here schematically shown as a track on the depicted optical disk, the computer program can be stored in any way which is suitable for the computer program product, such as a removable solid-state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for configuring a target device, the method performed by a user device and comprising:
   transmitting a configuration request message to the target device, the configuration request message comprising a configuration request and a request signature, wherein the configuration request message includes a unique session identifier, and wherein the request signature is based on the configuration request and a secret key of the user device;
   receiving a configuration response message from the target device, the configuration response message comprising a configuration response and a response signature, wherein the response signature is a cryptographic signature of a combination including the configuration response and the request signature, the response signature derived by using the secret key of the target device in a cryptographic signing operation;
   verifying the response signature to determine whether the configuration response message is valid, based on the configuration response, the request signature and a public key for the target device; and
   transmitting a configuration commit message to the target device only when the configuration response message is valid, the configuration commit message comprising a configuration commit indicator and a commit signature, wherein the commit signature is a cryptographic signature of a combination including the configuration commit indicator and the response signature, and is generated based on the secret key of the user device;
   wherein the user device stores the messages, including the signatures.

2. The method according to claim 1, further comprising:
   receiving a configuration acknowledgement message from the target device, the configuration acknowledgement message comprising a configuration acknowledgement and an acknowledgement signature, wherein the acknowledgement signature is based on the configuration acknowledgement and the commit signature; and
   verifying the acknowledgement signature to determine whether configuration acknowledgement message is valid, based on the configuration acknowledgement, the commit signature and a public key for the target device.

3. The method according to claim 1, wherein each signature is applied to a hash value of the input data for the signature.

4. The method according to claim 1, wherein all messages comprise the same single remote procedure call, RPC, identifier.

5. A user device for configuring a target device, the user device comprising:
a processor; and
a memory storing instructions that, when executed by the processor, cause the user device to:
transmit a configuration request message to the target device, the configuration request message comprising a configuration request and a request signature, wherein the configuration request message includes a unique session identifier, and wherein the request signature is based on the configuration request and a secret key of the user device;
receive a configuration response message from the target device, the configuration response message comprising a configuration response and a response signature, wherein the response signature is a cryptographic signature of a combination including the configuration response and the request signature, the response signature derived by using the secret key of the target device in a cryptographic signing operation;
verify the response signature to determine whether the configuration response message is valid, based on the configuration response, the request signature and a public key for the target device; and
transmit a configuration commit message to the target device only when the configuration response message is valid, the configuration commit message comprising a configuration commit indicator and a commit signature, wherein the commit signature is a cryptographic signature of a combination including the configuration commit indicator and the response signature, and is generated based on the secret key of the user device;
wherein the user device is configured to store the messages, including the signatures.

6. A non-transitory computer readable medium storing a computer program for configuring a target device, the computer program comprising computer program code which, when run on a user device causes the user device to:
transmit a configuration request message to the target device, the configuration request message comprising a configuration request and a request signature, wherein the configuration request message includes a unique session identifier, and wherein the request signature is based on the configuration request and a secret key of the user device;
receive a configuration response message from the target device, the configuration response message comprising a configuration response and a response signature, wherein the response signature is a cryptographic signature of a combination including the configuration response and the request signature, the response signature derived by using the secret key of the target device in a cryptographic signing operation;
verify the response signature to determine whether the configuration response message is valid, based on the configuration response, the request signature and a public key for the target device; and
transmit a configuration commit message to the target device only when the configuration response message is valid, the configuration commit message comprising a configuration commit indicator and a commit signature, wherein the commit signature is a cryptographic signature of a combination including the configuration commit indicator and the response signature, and is generated based on the secret key of the user device;
wherein the user device is configured to store the messages, including the signatures.

7. A method for configuring a target device, the method performed by the target device and comprising:
receiving a configuration request message from a user device, the configuration request message comprising a configuration request and a request signature, wherein the configuration request includes a unique session identifier, and wherein the request signature is based on the configuration request and a secret key of the user device;
verifying the request signature to determine whether configuration request message is valid, based on the configuration request and a public key for the user device;
transmitting a configuration response message to the user device only when the configuration request message is valid, the configuration response message comprising a configuration response and a response signature, wherein the response signature is a cryptographic signature of a combination including the configuration response and the request signature, the response signature derived by using the secret key of the target device in a cryptographic signing operation;
receiving a configuration commit message from the user device only when the configuration request message is valid, the configuration commit message comprising a configuration commit indicator and a commit signature, wherein the commit signature is a cryptographic signature of a combination including the configuration commit indicator and the response signature, and is generated based on the secret key of the user device; and
verifying the commit signature to determine whether configuration commit message is valid, based on the configuration commit indicator, the response signature and a public key for the user device;
wherein the target device stores the messages, including the signatures.

8. The method according to claim 7, further comprising:
applying configuration for the target device in accordance with the configuration request; and
transmitting a configuration acknowledgement message to the user device, the configuration acknowledgement message comprising a configuration acknowledgement and an acknowledgement signature, wherein the acknowledgement signature is based on the configuration acknowledgement and the configuration commit signature.

9. The method according to claim 8, wherein transmitting a configuration acknowledgement message comprises generating the acknowledgement signature based on a secret key of the target device.

10. The method according to claim 7, wherein each signature is applied to a hash value of the input data for the signature.

11. The method according to any claim 7, wherein all messages comprise the same single remote procedure call, RPC, identifier.

12. A target device comprising:
a processor; and
a memory storing instructions that, when executed by the processor, cause the target device to:

receive a configuration request message from a user device, the configuration request message comprising a configuration request and a request signature, wherein the configuration request message includes a unique session identifier, and wherein the request signature is based on the configuration request and a secret key of the user device;

verify the request signature to determine whether configuration request message is valid, based on the configuration request and a public key for the user device;

transmit a configuration response message to the user device only when the configuration request message is valid, the configuration response message comprising a configuration response and a response signature, wherein the response signature is a cryptographic signature of a combination including the configuration response and the request signature, the response signature derived by using the secret key of the target device in a cryptographic signing operation;

receive a configuration commit message from the user device only when the configuration request message is valid, the configuration commit message comprising a configuration commit indicator and a commit signature, wherein the commit signature is a cryptographic signature of a combination including the configuration commit indicator and the response signature, and is generated based on the secret key of the user device; and verify the commit signature to determine whether configuration commit message is valid, based on the configuration commit indicator, the response signature and a public key for the user device;

wherein the target device is configured to store the messages, including the signatures.

13. A non-transitory computer readable medium storing a computer program for configuring a target device, the computer program comprising computer program code which, when run on a target device causes the target device to:

receive a configuration request message from a user device, the configuration request message comprising a configuration request and a request signature, wherein the configuration request message includes a unique session identifier, and wherein the request signature is based on the configuration request and a secret key of the user device;

verify the request signature to determine whether configuration request message is valid, based on the configuration request and a public key for the user device;

transmit a configuration response message to the user device only when the configuration request message is valid, the configuration response message comprising a configuration response and a response signature, wherein the response signature is a cryptographic signature of a combination including the configuration response and the request signature, the response signature derived by using the secret key of the target device in a cryptographic signing operation;

receive a configuration commit message from the user device only when the configuration request message is valid, the configuration commit message comprising a configuration commit indicator and a commit signature, wherein the commit signature is a cryptographic signature of a combination including the configuration commit indicator and the response signature, and is generated based on the secret key of the user device; and verify the commit signature to determine whether configuration commit message is valid, based on the configuration commit indicator, the response signature and a public key for the user device;

wherein the target device is configured to store the messages, including the signatures.

\* \* \* \* \*